US010890209B2

(12) United States Patent
Arginteanu

(10) Patent No.: US 10,890,209 B2
(45) Date of Patent: Jan. 12, 2021

(54) GIMBAL SYSTEM USING GROOVED ROTATABLE BALL, ORTHOGONALLY ORIENTED GEARS, AND SOCKET CASING

(71) Applicant: Toren Arginteanu, Cresskill, NJ (US)

(72) Inventor: Toren Arginteanu, Cresskill, NJ (US)

( * ) Notice: Subject to any disclaimer, the term of this patent is extended or adjusted under 35 U.S.C. 154(b) by 0 days.

(21) Appl. No.: 15/946,302

(22) Filed: Apr. 5, 2018

(65) Prior Publication Data
US 2018/0223898 A1     Aug. 9, 2018

Related U.S. Application Data

(63) Continuation-in-part of application No. 15/241,073, filed on Aug. 19, 2016, now abandoned.

(51) Int. Cl.
| *F16C 11/06* | (2006.01) |
| *F16H 19/00* | (2006.01) |
| *F16M 11/14* | (2006.01) |
| *F16M 11/18* | (2006.01) |
| *F16M 13/00* | (2006.01) |
| *B64C 39/02* | (2006.01) |
| *B64D 47/08* | (2006.01) |
| *F16M 11/00* | (2006.01) |
| *F16C 11/10* | (2006.01) |
| *F16C 33/10* | (2006.01) |

(52) U.S. Cl.
CPC ........ *F16C 11/0604* (2013.01); *B64C 39/024* (2013.01); *B64D 47/08* (2013.01); *F16C 11/0619* (2013.01); *F16H 19/001* (2013.01); *F16M 11/00* (2013.01); *F16M 11/14* (2013.01); *F16M 11/18* (2013.01); *F16M 13/00* (2013.01); *B64C 2201/127* (2013.01); *F16C 11/10* (2013.01); *F16C 33/107* (2013.01)

(58) Field of Classification Search
CPC ... F16C 11/0604; F16C 11/10; F16C 11/0619; F16C 33/107; F16H 19/001; F16M 11/14; F16M 11/18; F16M 13/00; F16M 11/00; B64C 39/024; B64C 2201/127; B64D 47/08
See application file for complete search history.

(56) References Cited

U.S. PATENT DOCUMENTS

| 3,564,890 | A | * | 2/1971 | Catapano | .................. G01S 1/02 |
| | | | | | 116/299 |
| 4,194,437 | A | * | 3/1980 | Rosheim | .............. B25J 17/0275 |
| | | | | | 60/567 |
| 4,360,230 | A | * | 11/1982 | Wood | ........................ B66C 1/66 |
| | | | | | 294/82.3 |

(Continued)

FOREIGN PATENT DOCUMENTS

| CN | 203573564 U | * | 4/2014 |
| CN | 206481886 U | * | 9/2017 |

*Primary Examiner* — Kimberly T Wood

(57) ABSTRACT

A gimbal system is provided. The gimbal system includes a grooved, rotatable ball, including a plurality of grooves, wherein two or more of the plurality of grooves are configured to be complimentary with a plurality of teeth of a first gear, and wherein two or more of the plurality of grooves are configured to be complimentary with a plurality of teeth of a second gear. The gimbal system further includes the first gear and the second gear, wherein the first gear and the second gear are approximately perpendicular to each other.

3 Claims, 9 Drawing Sheets

(56) References Cited

U.S. PATENT DOCUMENTS

| | | | |
|---|---|---|---|
| 4,620,813 A * | 11/1986 | Lacher | F16C 11/106 |
| | | | 248/182.1 |
| 4,641,550 A * | 2/1987 | Meyman | F16H 33/10 |
| | | | 475/254 |
| 5,344,325 A * | 9/1994 | Wang | G09B 27/02 |
| | | | 368/16 |
| 5,533,418 A * | 7/1996 | Wu | B25J 9/102 |
| | | | 248/181.1 |
| 5,872,417 A | 2/1999 | Sugaya | |
| 5,890,438 A * | 4/1999 | Frankish | A47B 9/04 |
| | | | 108/147 |
| 6,536,724 B2 | 3/2003 | Furuta | |
| 6,734,914 B1 | 5/2004 | Nishimura et al. | |
| 7,857,727 B2 * | 12/2010 | Rung | B25J 17/0275 |
| | | | 403/76 |
| 8,179,007 B2 | 5/2012 | Van Der Walt | |
| 8,377,060 B2 * | 2/2013 | Vasta | A61B 17/60 |
| | | | 606/56 |
| 8,425,512 B2 * | 4/2013 | Vasta | A61B 17/60 |
| | | | 606/56 |
| 8,760,152 B2 * | 6/2014 | Uhlenbruck | F16H 59/044 |
| | | | 324/207.2 |
| 2005/0018074 A1 * | 1/2005 | Nakamoto | H04N 5/2259 |
| | | | 348/375 |
| 2008/0106170 A1 | 5/2008 | Knowles et al. | |
| 2009/0028542 A1 * | 1/2009 | Nakamoto | H04N 5/2259 |
| | | | 396/427 |
| 2009/0038421 A1 | 2/2009 | Wilson et al. | |
| 2015/0066002 A1 | 3/2015 | Cooper et al. | |
| 2016/0090195 A1 | 3/2016 | Blackburn et al. | |

\* cited by examiner

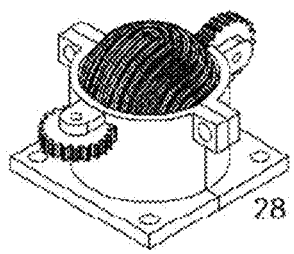
FIG. 12A
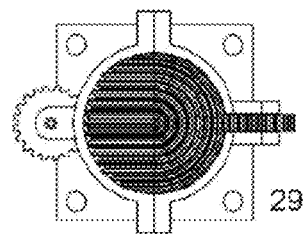
FIG. 12B
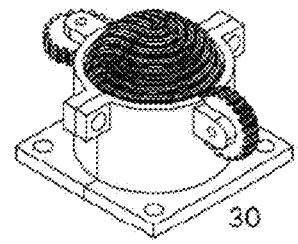
FIG. 12C
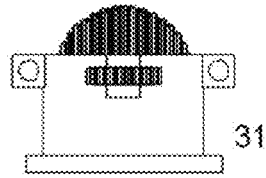
FIG. 12D
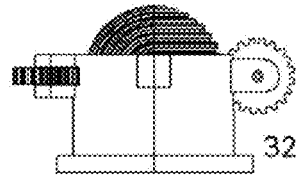
FIG. 12E
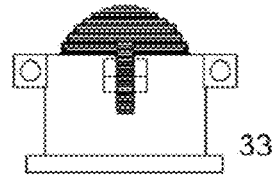
FIG. 12F
FIG. 13
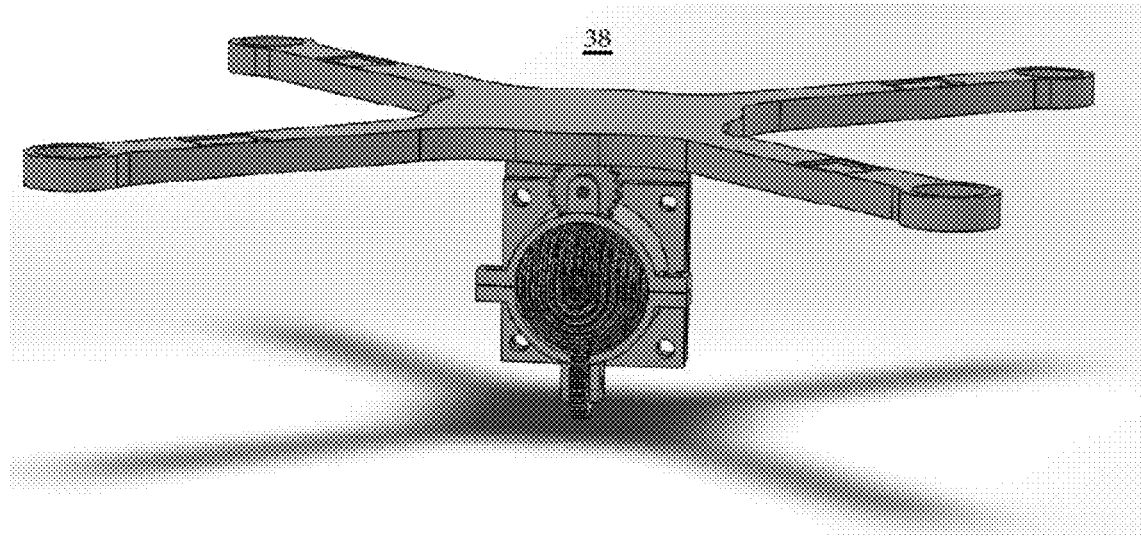

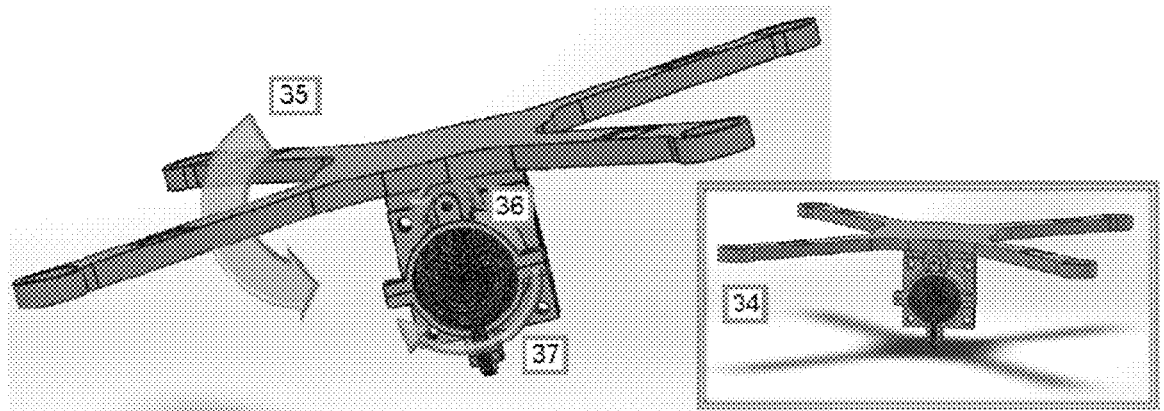
FIG. 14A
FIG. 14B
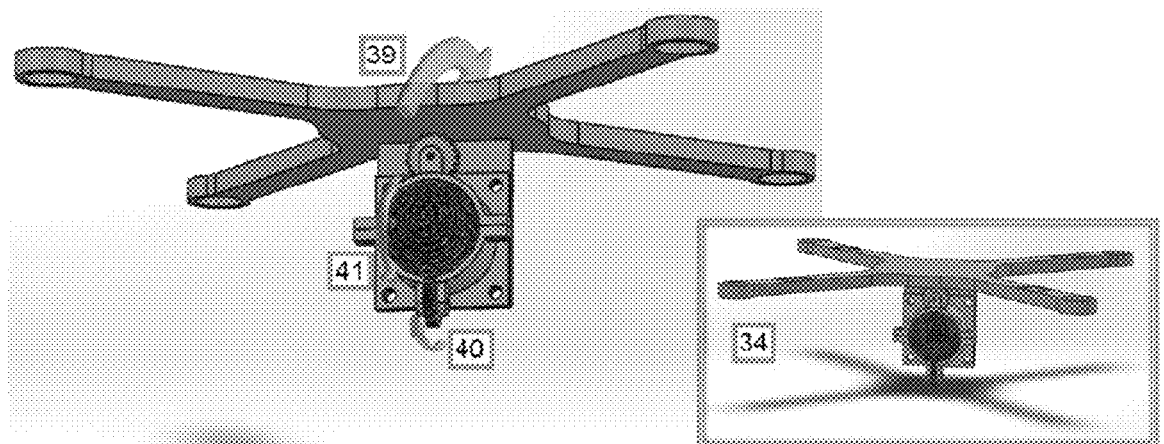
FIG. 15A
FIG. 15B

GIMBAL SYSTEM USING GROOVED ROTATABLE BALL, ORTHOGONALLY ORIENTED GEARS, AND SOCKET CASING

CLAIM OF PRIORITY

This application claims priority to U.S. patent application Ser. No. 15/241,073, filed Aug. 19, 2016, and herein incorporated by reference in its entirety.

FIELD OF THE EMBODIMENTS

Certain embodiments of the present disclosure generally relate to gimbal devices, which have proven useful in many embodiments as described below. The specific gimbal described herein has numerous advantages and may be used as part of any machine incorporating a gimbal system.

BACKGROUND OF THE EMBODIMENTS

As is known in the mechanical arts, gimbal systems are useful for a wide range of applications. Several well-known examples include gimbal suspension systems with two degrees of freedom which are used to support coin operated telescopes at scenic spots of public parks. A gimbal utilizing three degrees of freedom is found in altitude sensing gyroscopes in aircraft and space platforms. Rocket engines are mounted on gimbals allowing the exhaust nozzle of the rocket to be swiveled from side to side. In the arts of photography and imaging, a gimbal head rotates a lens allowing for easy and smooth manipulation while tracking moving subjects.

Attempts to improve gimbal systems have been the subject of multiple previous patents. Knowles et al., in U.S. Pat. No. 0,106,170 described a non-mechanical system that includes a gimbal housing, rotatable sphere and curvilinear actuators. The curvilinear actuators rotate the sphere, via shear induced motion. Nishimura et al., in U.S. Pat. No. 6,734,914 and Sugaya, in U.S. Pat. No. 5,872,417 each described gimbal systems permitting 360 degrees of rotation. The devices they describe are actuated by piezoelectric elements which drive a spherical rotary unit. Blackburn et al., in U.S. Pat. No. 0,090,195, described a turret based gimbal mechanism which rotates a sphere by the action of a pair of opposing yoke arms. Wilson et al., in U.S. Pat. No. 0,038,421 described a joint system capable of providing motion through multiple degrees of freedom. Van Der Walt, in U.S. Pat. No. 8,179,007 described a ball in socket type gimbal arrangement which is actuated via electromagnetic force. Furuta, in U.S. Pat. No. 6,536,724 described a gimbal that is supported by two columns fixed to a mounting surface. Additional rotational control is provided by a sensor head fixed to the gimbal. Cooper et al., in U.S. Pat. No. 0,066,002 described a system comprised of multiple stacked disks. Pitch and yaw are controlled via actuation cables.

The above do not provide a mechanically simplified, lightweight, component-minimized, compact device which provides for the unlimited rotational drive of its spherical element that eliminates the undesirable exertion of force against its motor interface. Many existing gimbal devices exert undue force against their motor interface, wasting energy and rendering the system inefficient. (This occurs when one actuator exerts undue force and torque against the other according to Newton's third law.) Furthermore, the above typically rely on friction, piezoelectric effect, and/or electromagnetic forces to actuate the movement of the gimbal, limiting fine motor control, speed, and accuracy, and possibly causing wear on the components. Many such devices involve various moving parts mechanically connected to each other. The mechanical connections create resonances, instabilities, and hysteresis, making the devices difficult to adjust and maintain in alignment.

Therefore, what is preferred is an improved gimbal system capable of rapidly rotating a sphere in multiple degrees of freedom using a gear-toothed rotatable ball within a socket joint. The manner in which the teeth of the actuating gears engage with the grooves in the spherical ball allows for superior mechanical power transmission and more precise control throughout multiple degrees of freedom.

SUMMARY OF THE EMBODIMENTS

According to an aspect of the present invention, a gimbal system is provided. The gimbal system includes a grooved, rotatable ball, including a plurality of grooves, wherein two or more of the plurality of grooves are configured to be complimentary with a plurality of teeth of a first gear, and wherein two or more of the plurality of grooves are configured to be complimentary with a plurality of teeth of a second gear. The gimbal system further includes the first gear and the second gear, wherein the first gear and the second gear are approximately perpendicular to each other.

It is an object of the present invention to provide the gimbal system, wherein the gimbal system further includes a housing encompassing at least a portion of the grooved, rotatable ball, the first gear, and the second gear.

It is an object of the present invention to provide the gimbal system, wherein the housing is configured to stabilize a relative position of the grooved, rotatable ball, the first gear, and the second gear within the housing.

It is an object of the present invention to provide the gimbal system, wherein the gimbal system further includes at least one power source coupled to the first gear and the second gear, configured to rotate the first gear and the second gear.

It is an object of the present invention to provide the gimbal system, wherein the first gear and the second gear are configured to rotate independently of each other.

This invention relates generally to gimbal systems and may be used advantageously in place of gimbal systems designed and utilized as described above or in any other device which calls for a gimbal. A cup shaped housing supports a ball. The movement ball is controlled by two orthogonally oriented gears whose teeth engage grooves on the ball. The ball has been uniquely designed with grooves constructed by rotating a gear perpendicularly around each hemisphere. The specific design of the grooves and interaction with the teeth of the gears provides for the advantageous attributes of the system.

This gimbal system could be adapted for use on a moving apparatus such as, but not limited to, drone (unmanned aerial vehicle) photography. Such systems generally offer two axes of rotation to stabilize a camera in the pitch and roll directions, which are notoriously unsteady on a drone in flight. Without a fast-responding gimbal system offering the necessary degrees of freedom, drone photography would be of poor quality; without an energy efficient system, much needed and already limited battery power will drain quickly. Among many other applications, the fine motor control and multiple degrees of freedom offered by this novel gimbal system could also be used in the design of robotic eyes, medical and/or surgical instrumentations, rocket-propelled devices and spacecraft, and in general any system in which one device must be stabilized and/or rotated freely about multiple axes with respect to another device.

BRIEF DESCRIPTION OF THE DRAWINGS

FIGS. 12A-12F show six views of the gimbal system assembly, according to an embodiment of the present invention.

FIG. 13 shows a gimbal system positioned on an unmanned aerial vehicle (UAV), according to an embodiment of the present invention.

FIGS. 14A-14B show two views of the roll of the UAV and the stabilizing response of the gimbal system positioned on the UAV, according to an embodiment of the present invention.

FIGS. 15A-15B show two views of the pitch of the UAV and the stabilizing response of the gimbal system positioned on the UAV, according to an embodiment of the present invention.

DESCRIPTION OF THE PREFERRED EMBODIMENTS

Figures 1A, 1B:
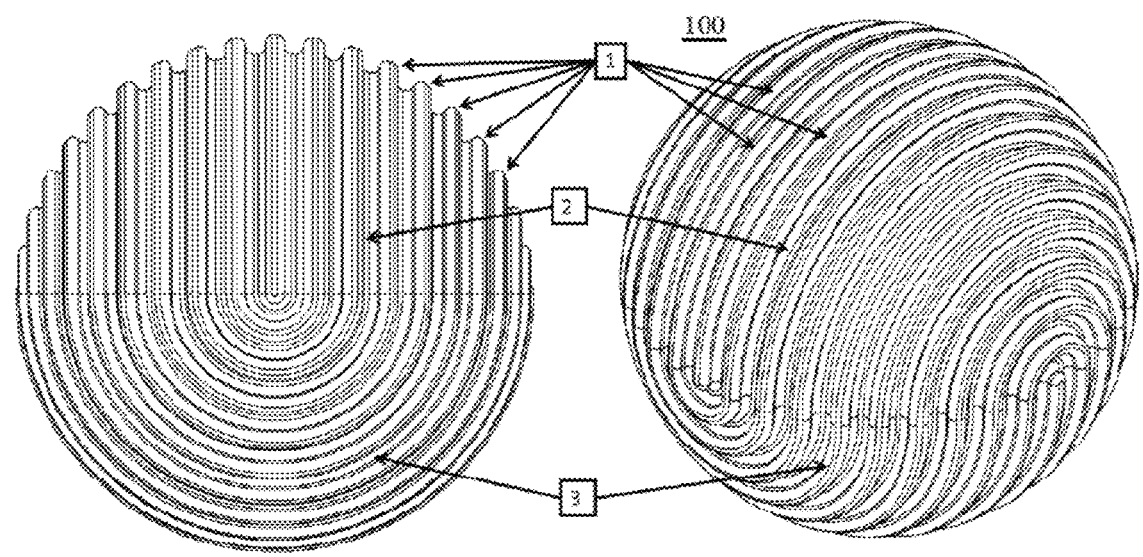
FIGS. 1A-1B show a front view (FIG. 1A) and an isometric view (FIG. 1B) of a grooved rotatable ball, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figures 2A, 2B:
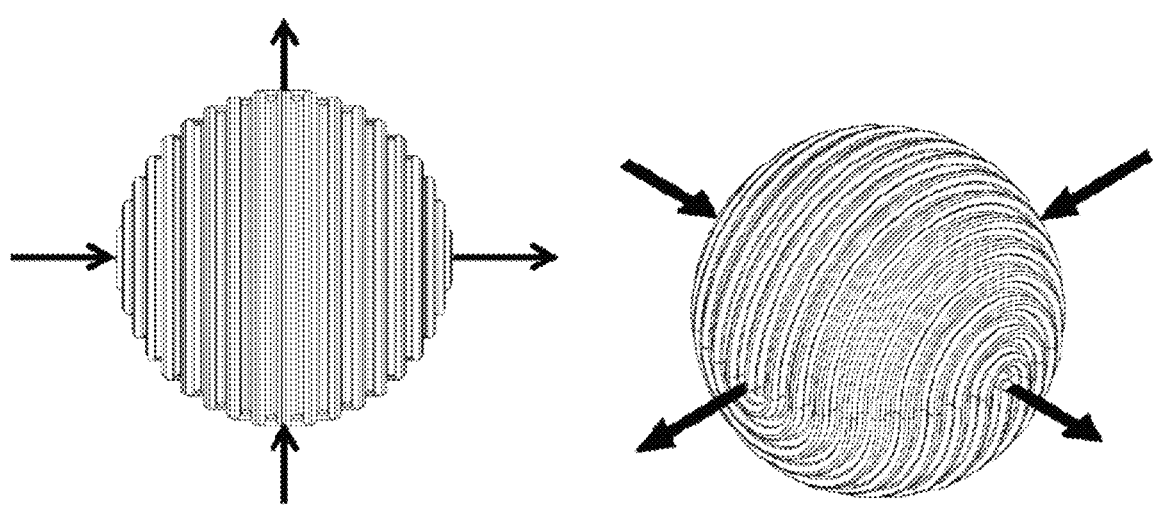
FIGS. 2A-2B show a top view (FIG. 2A) and an isometric view (FIG. 2B) of two axes of rotation of the grooved rotatable ball, according to an embodiment of the present invention.
Figure 3A:
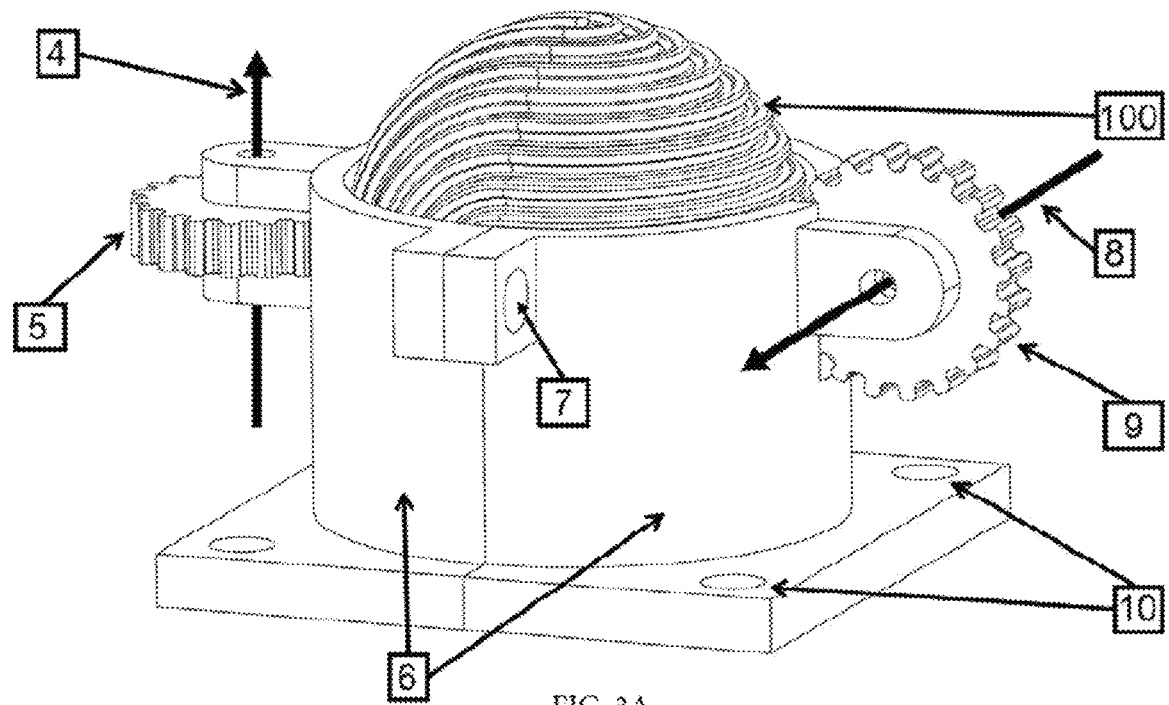
FIG. 3A shows an assembled gimbal system, according to an embodiment of the present invention.
Figure 3B:
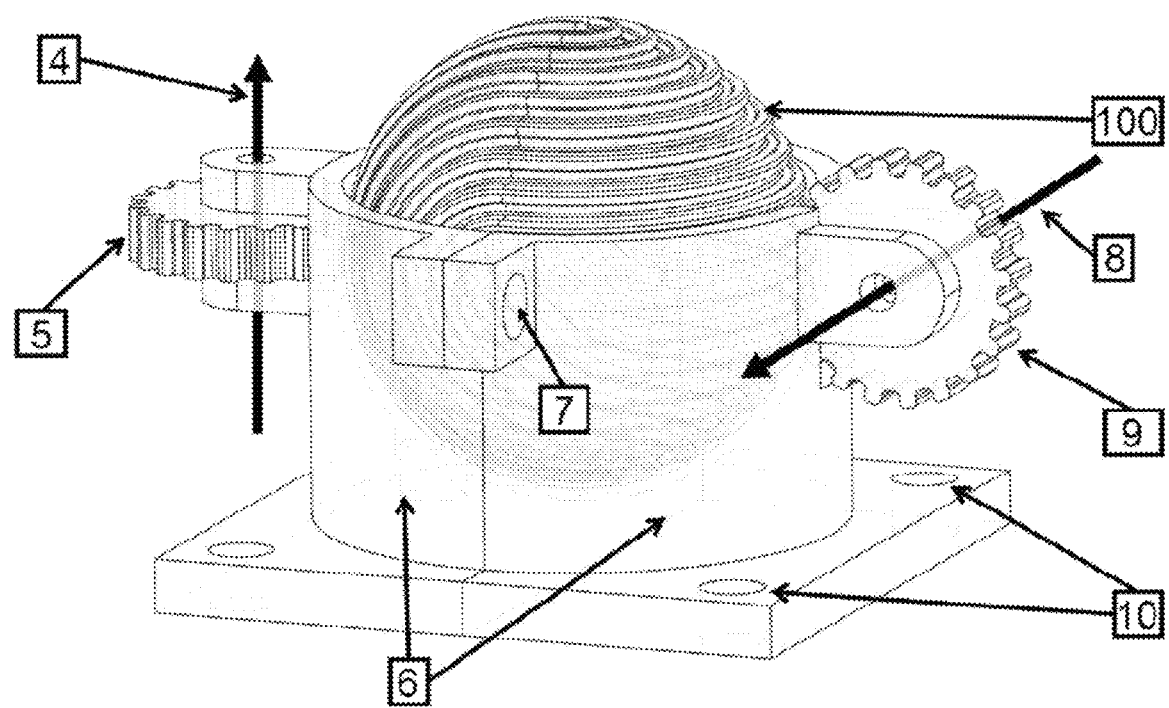
FIG. 3B shows an assembled gimbal system, according to an embodiment of the present invention.
Figures 4A, 4B:
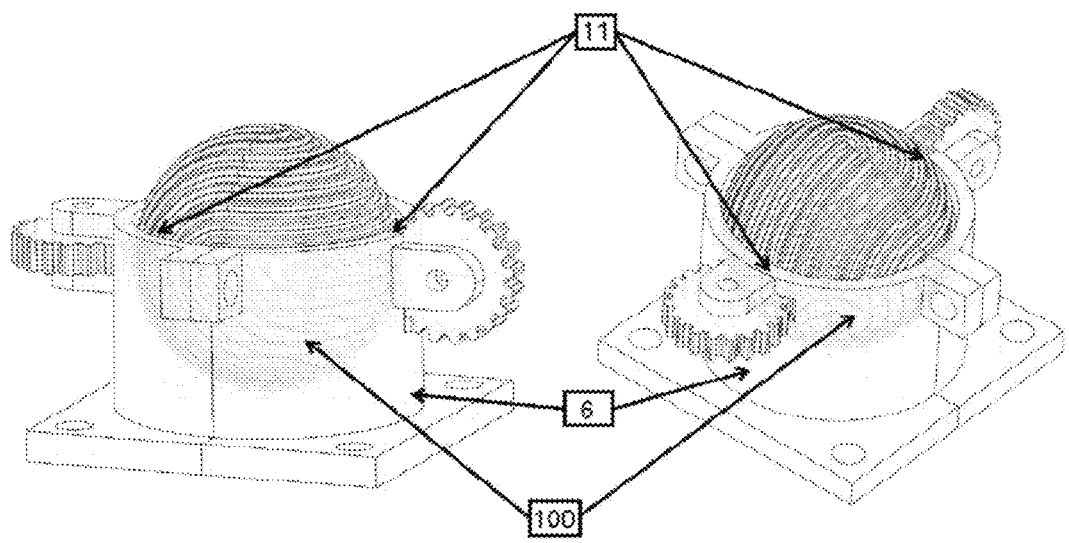
FIGS. 4A-4B show a front isometric view (FIG. 4A) and an upper isometric view (FIG. 4B) of an assembled gimbal system, according to an embodiment of the present invention.
Figure 5A:
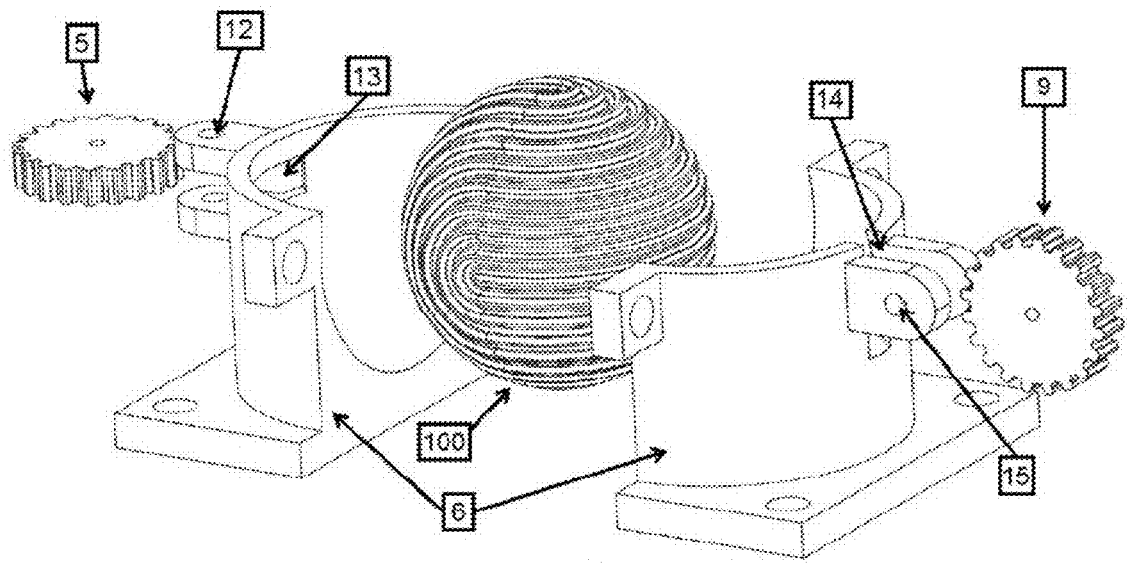
FIG. 5A shows an exploded view of a gimbal system, according to an embodiment of the present invention.
Figure 5B:
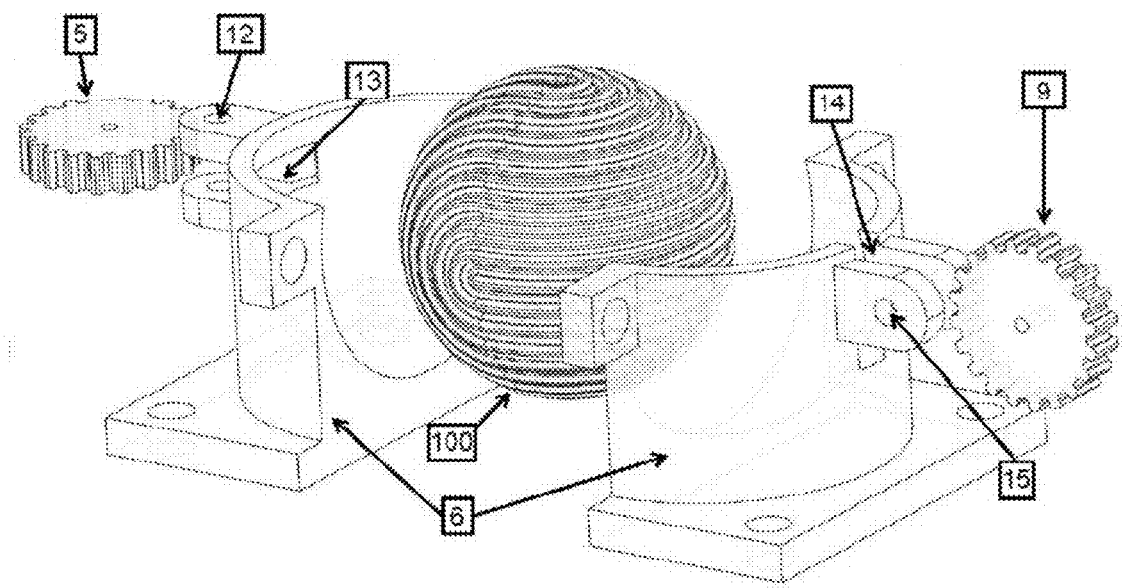
FIG. 5B shows an exploded view of a gimbal system, according to an embodiment of the present invention.

The subject invention is directed to a new and useful gimbal system. A ball 100 has been designed with parallel, semi-circumferential grooves wrapping around each hemisphere 2, 3 (as shown in FIGS. 1A-1B) to engage with the actuator teeth on gears 11 (shown in FIGS. 4A-4B). This ball 100 is capable of rotating with multiple degrees of freedom (FIGS. 2A-2B) relative to its socket-like housing 6 (shown in FIGS. 3A-3B and 5A-5B). The ball 100 is driven by the actuation of two orthogonally oriented gears 5, 9 (shown in FIGS. 3A-3B) (also referred to as actuators), each engaging with the grooves 1 on one hemisphere of the ball. The present disclosure overcomes drawbacks experienced in the art and provides additional benefits. An electronic device such as a camera or an infrared sensor or another mechanical device can be attached to the rotating part of the gimbal. According to an embodiment, the housing 6 (also referred to as a casing) may include one or more holes 7 for attaching the housing 6 components together (e.g., via nut and bolt and/or any other suitable means).

Figure 9:
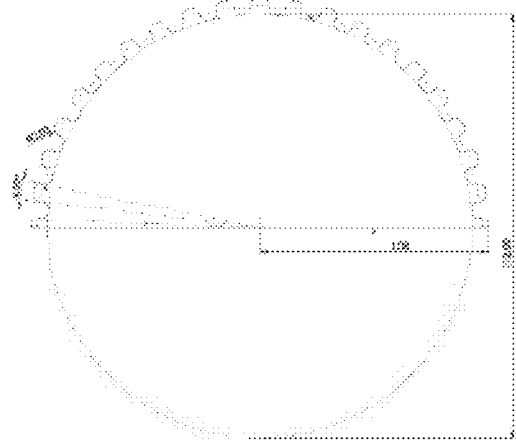
FIG. 9 shows a two-dimensional outline of half a gear used to construct the grooved rotatable ball, according to an embodiment of the present invention.
Figure 10A:
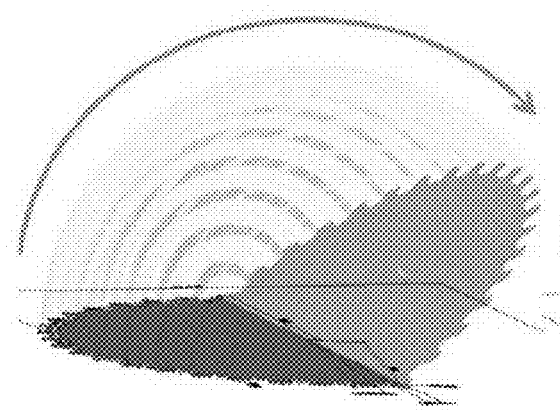
FIGS. 10A-10B show two views of the superior hemisphere of the grooved rotatable ball, according to an embodiment of the present invention.
Figure 10B:
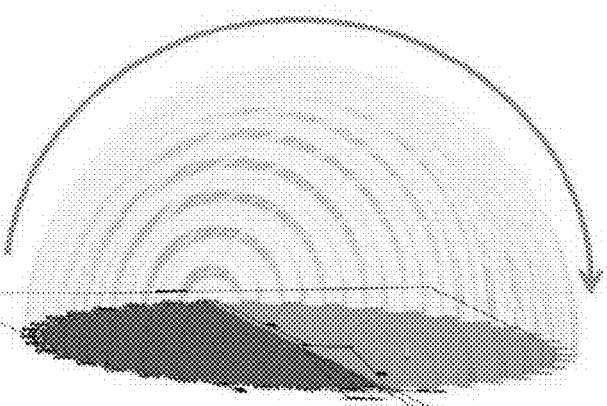
Figure 11A:
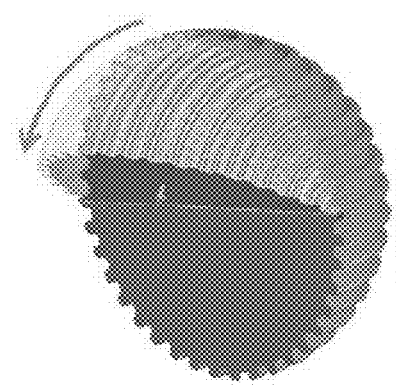
FIGS. 11A-11C show three views of the inferior hemisphere of the grooved rotatable ball, according to an embodiment of the present invention.
Figure 11B:
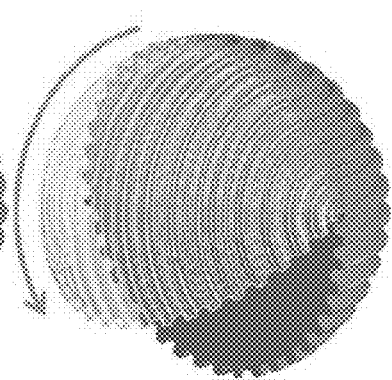
Figure 11C:
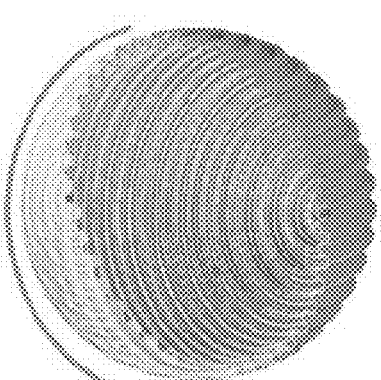

The grooved ball 100 is designed by taking the two-dimensional outline of half a gear—a toothed, semicircular shape (FIG. 9)—and rotating it 180 degrees about its diameter line, producing a grooved superior hemisphere (FIGS. 10A-10B). From the flat face of this superior hemisphere 2 (which, by necessity, lies upon the plane on which the original gear outline was drawn), a second outline of a half-gear is rotated 180 degrees about a diameter line perpendicular to the original diameter line (FIGS. 11A-11C), producing the inferior hemisphere 3. As a result, the "engagement grooves" 1 on the superior hemisphere 2 are perpendicular to those on the inferior hemisphere 3, so that one standard "two dimensional" gear 5 can engage with the superior hemisphere's 2 grooves 1, while a perpendicularly oriented "two-dimensional" gear 9 can engage with the inferior hemisphere's 3 grooves 11. By rotating the two gears 5, 9, one can drive the ball 100 about the pitch axis and the roll axis, respectively. Because the grooves 1 on a given hemisphere wrap around the curvature to the ball 100 parallel to each other, when one gear drives the ball about one axis, the other gear's engagement teeth slide freely along the gear's grooves without impeding the ball's motion. The fact that rotating the lightweight ball 100 is the only motion necessary to produce the desired effect is an improvement upon the art, much of which required moving heavier components with longer lever arms, resulting in unnecessary torque and, therefore, an inefficient waste of energy. FIGS. 8A-8D show the rotation 23 of the horizontally-oriented gear 5 and the rotation 25 of the vertically-oriented gear 9.

The socket is a secure, concave housing 6 stabilizing the ball 100. Apertures have been designed in the socket 13, 14 (shown in FIGS. 5A-5B) to allow the gears 5, 9 to engage with the ball 100, with holes 12, 15 (shown in FIGS. 5A-5B) through which small pins to hold the gears in place may pass. This structure allows rotation through multiple degrees of freedom, but constricts motion of the ball 100 and gears 5, 9 so that each gear 5, 9 is forced to turn only about its axis 4, 8 and the ball 100 is free to rotate about both axes 4, 8 but not to exit the cup 6 and roll away from the gears 5, 9.

The benefits of having both gears 5, 9 fixed in space relative to the cup 6 (which may be fixed in space relative to a drone, unmanned aerial vehicle (UAV) 38 (as shown in FIGS. 13, 14A-14B, and 15A-15B), and/or other instrument) as compared to existing gimbal systems used on drones are numerous. Since both gears 5, 9 are fixed, any motors or servo motors employed to drive them can also be fixed. These motors may include a motor 19 driving the horizontally-oriented gear 5, motors 21 driving the vertically-oriented gear 9. According to an embodiment, the motors 19, 21 may be connected to a power source 42 (such as a battery) via a wired connection 20, 22. It is noted, however, that any suitable powering means 42 may be used while maintaining the spirit of the present invention. According to an embodiment, the gears 5, 9 are powered by the same power source 42. According to an embodiment, the gears 5, 9 are powered using separate power sources.

Figures 6A, 6B:
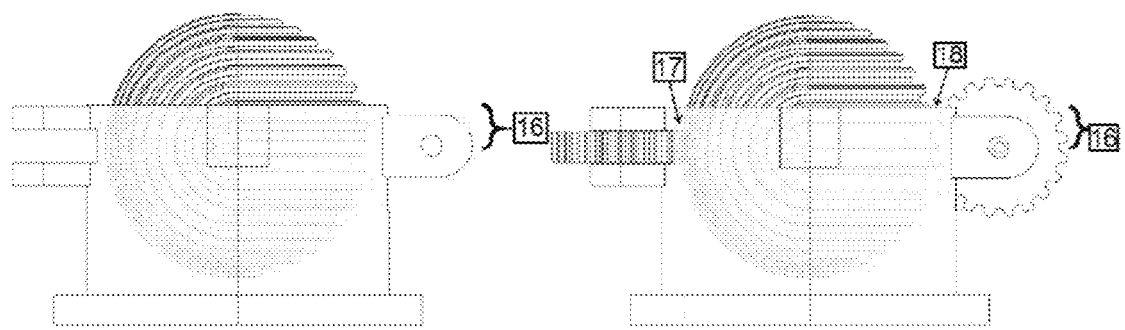
FIGS. 6A-6B show two views of a gimbal system assembly, according to an embodiment of the present invention.
Figure 7A:
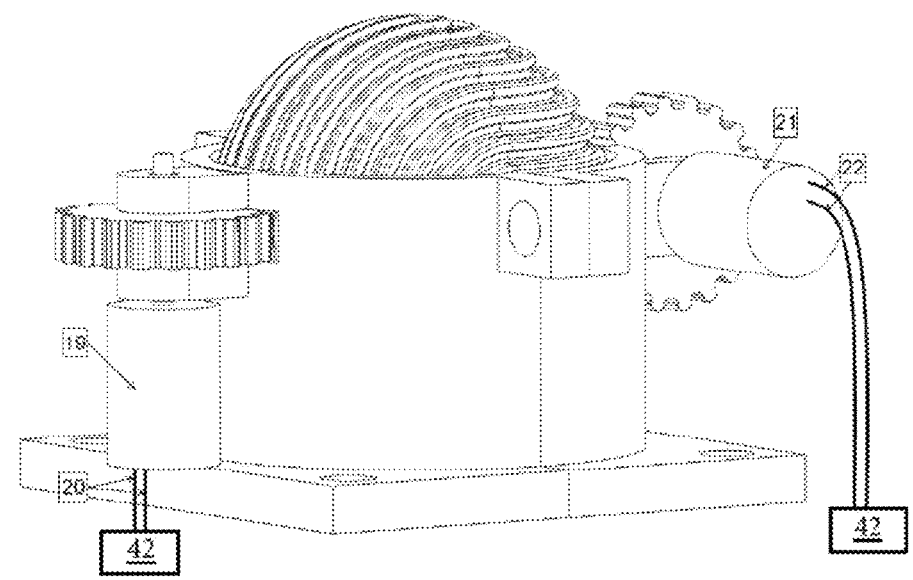
FIG. 7A shows an isometric view of a gimbal system, according to an embodiment of the present invention.
Figure 7B:
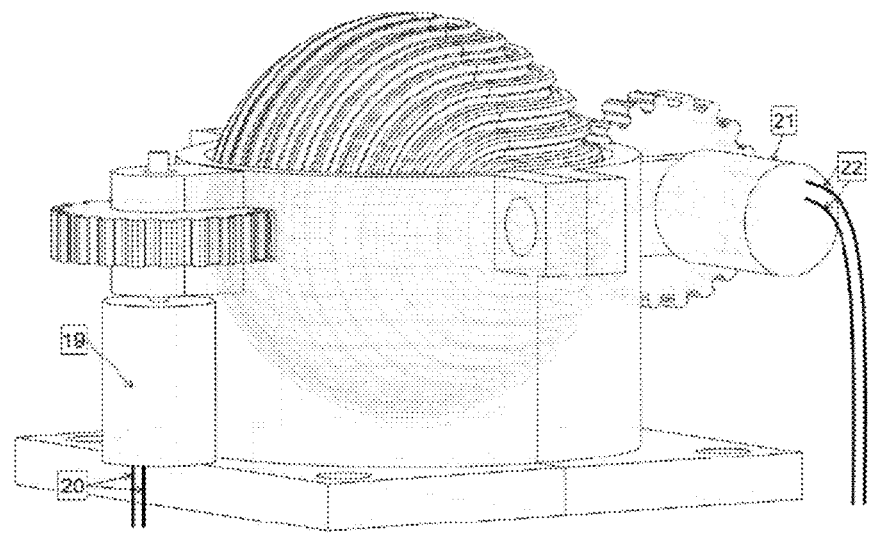
FIG. 7B shows an isometric view of a gimbal system, according to an embodiment of the present invention.
Figure 8A:
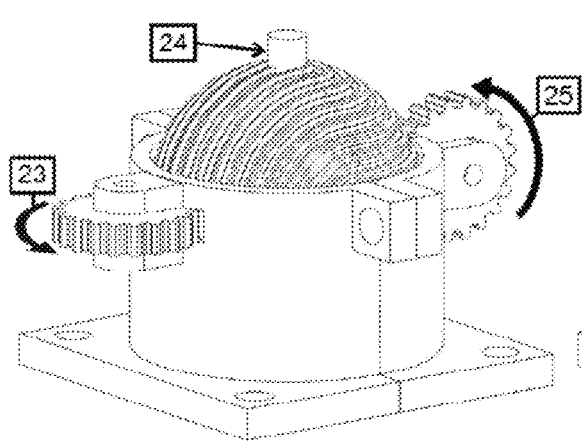
FIGS. 8A-8B show two isometric views of a gimbal system having a stopping mechanism, according to an embodiment of the present invention.
Figure 8B:
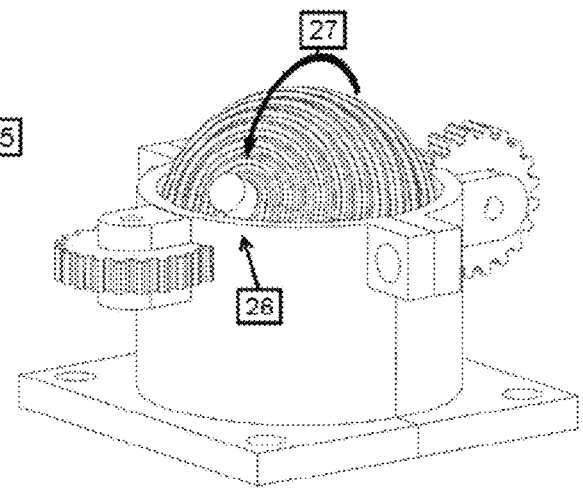
Figure 8C:
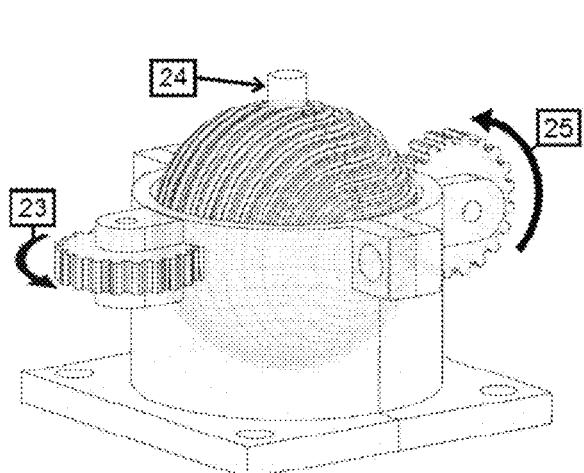
FIGS. 8C-8D show two isometric views of a gimbal system having a stopping mechanism, according to an embodiment of the present invention.
Figure 8D:
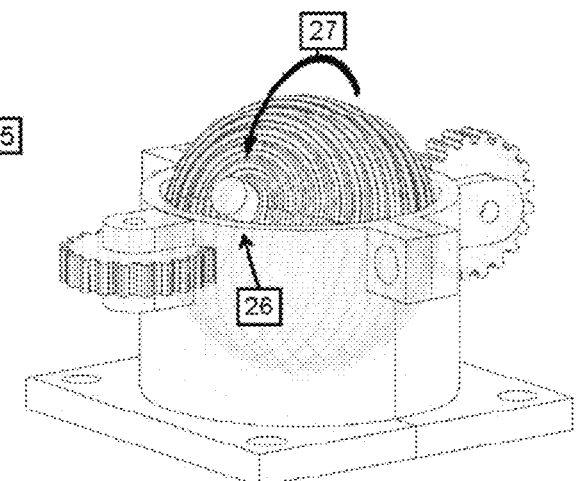

Unlike in many existing gimbal systems, the position of one motor is completely independent from that of the other. This, along with the ability of an inactive gear to slide freely through the groves on the ball while an active gear drives the ball, means that one motor will not exert a reverse force or torque against the other (in accordance with Newton's third law), causing both motors to expend unnecessary energy just to keep the system stationary. It also greatly reduces the potential of motor wires becoming tangled during motion of the system. When fully assembled, the cup 6 is designed to cover just barely more than half of the ball 100 (as shown in FIGS. 6A-6B, 16), so that the ball 100 and any device attached to it will not fall out of the cup even when the system is turned upside-down and the exposed portion of the ball 100 faces down. Within this constraint, the amount of the ball 100 to be exposed must be maximized so as to give the ball 100 as close to a hemispherical view as possible, maximizing the possible degrees of freedom. According to an embodiment, as shown at 17, the horizontally-oriented gear's 5 teeth are interlocked with the grooves 1 on the ball 100. According to an embodiment, as shown at 18, the vertically-oriented gear's 9 teeth are interlocked with the grooves 1 on the ball 100. This interlocking is also shown at 11 in FIGS. 4A-4B. According to an embodiment, the housing 6 holds all of the components in place with respect to one another. It holds the ball 100 in place, allowing it to rotate freely but not translate, and it holds the gears 5, 9 in place in reference to the ball 100 but allows them to rotate freely about their respective center axes.

According to an embodiment, the grooves 1 on the ball 100 are designed to work like teeth on a normal gear. The way the grooves 1 are oriented on the ball 100 is unique because the groove surface curves in 3 dimensions as opposed to a gear with a 2 dimensional flat extruded surface. Also, normally, gears connect to other gears but, in this invention, the gears 5, 9 connect directly to the ball 100. The orientation of grooved teeth 1 on the ball allows the gears 5, 9 to actuate the ball along its two distinct axes of rotation, as opposed to one axis of rotation.

According to an embodiment, the gimbal system includes one or more stopping mechanism 24 (as shown in FIGS. 8A-8D). According to an embodiment, the rotation of the ball 100 ends when a collision with the stopping mechanism 24 occurs (as shown at 26 of FIGS. 8A-8D). According to an embodiment, the stopping mechanism 24 stops the rotation of the ball 100 approximately 90 degrees from the starting position. 27 of FIGS. 8A-8D indicates the rotation of the ball 100 in response to the gears 5, 9.

In order to optimize the performance of the gimbal system, the range of motion of the ball 100 should be as close to hemispherical as possible. The field of view is limited by the region of the cup 6 that covers the ball 100 (which is necessary to keep the ball in place), and by the region on the surface of the ball 100 that might be occupied by a camera or other device. Thus, the size of the ball 100 should be as large as possible with respect to the size of the camera and the height of the cup 6, and these quantities should be minimized with respect to the size of the ball 100. The maximization of the ball 100 size must be within reason, especially if the gimbal is to be attached onto a moving object, such as a drone or other UAV 38. According to an embodiment, the gimbal includes one or more holes 10 for connecting the gimbal to another device. Additionally, the ball 100 should fit as snugly as possible within the socket to prevent escape of the ball and to minimize non-rotational motion of the ball within the cup (such as shaking), but the size difference between ball and socket must not be so small that the ball does not fit or there is too much friction inhibiting or preventing the ball's 100 rotation. This limitation could be ameliorated by lubricating the ball and socket joint. According to an embodiment, the housing 6 and/or gears 5, 9 are lubricated in order to reduce friction with the ball 100.

It is noted that the ball 100 may be produced using any suitable means. For example, the ball 100 may be produced using a 3-Dimensional (3D) printer and/or machined out of metal. According to various embodiments, the gears 5, 9 may be 3D printed, laser cut (e.g., using a high powered laser to cut out the shape of the gears out of a flat piece of material), and/or produced using any other suitable means.

FIGS. 12A-12F show various views of the gimbal system, including: an isometric view 28 from the left side; a top view 29; an isometric view 30 from the right side; a view 31 from the left side, showing the horizontally-oriented gear; a side view 32; and a view 33 from the right side, showing the vertically-oriented gear.

According to various embodiments of the present invention, the gimbal system may be secured to a moving object, such as the UAV 38 shown in FIGS. 13, 14A-14B, and 15A-15B. The gimbal system may be used to alter the motion of the moving object. As shown in FIGS. 14A-14B and 15A-15B, a moving object (the UAV 38, in the embodiments shown in FIGS. 14A-14B and 15A-15B) is in a level position 34.

As shown in FIGS. 14A-14B, the rolling motion 35 of the UAV 38 is shown, along with the actuation 36 of the gimbal gear to drive the ball 100, and the motion 37 of the gimbal ball 100 to counter the actuation 36 of the gimbal gear.

As shown in FIGS. 15A-15B, the pitching motion 39 of the UAV 38 is shown, along with the actuation 40 of the gimbal gear to drive the ball 100, and the motion 41 of the gimbal ball 100 to counter the actuation 40 of the gimbal gear.

These and other features of the integrated gimbal system of the subject invention and the manner in which it is employed will become more readily apparent to those having ordinary skill in the art from the following enabling description of the preferred embodiments of the subject invention taken in conjunction with the several drawings described below. Embodiments of the present invention may also be capable of other and different applications, and its several details may be modified in various respects, all without departing from the spirit and scope of embodiments of the present invention. Accordingly, the drawings and descriptions are to be regarded as illustrative in nature, and not as restrictive. The drawings are not necessarily drawn to scale. The description is intended to cover all modifications, equivalents and alternatives falling within the spirit and scope of the claims.

When introducing elements of the present disclosure or the embodiment(s) thereof the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A gimbal system, comprising:
   a spherical ball having two sets of parallel, semi-circumferential grooves, each set wrapping around a respective hemisphere, the first set of the grooves arranged in a first direction, and the second set of the grooves arranged in a second direction perpendicular to the first direction;
   a housing having a concave space containing the ball, the concave space forming a cup covering more than half of the ball, within which the ball can freely rotate but cannot fall out, the housing configured to be attached to a support, wherein the ball is driven to counter the actuation of at least one gimbal gear:
   a first gimbal gear having actuator teeth, held in the housing to spin around a central axis of the first gimbal gear and arranged to engage the first set of grooves to rotate the ball up to 180 degrees around a first axis parallel to the central axis of the first gear;
   a second gimbal gear having actuator teeth, held in the housing to spin around a central axis of the second gimbal gear perpendicular to the central axis of the first gimbal gear, and arranged to engage the second set of grooves to rotate the ball up to 180 degrees around a second axis parallel to the central axis of the second gear;
   wherein when the first gimbal gear is activated to rotate the spherical ball, the actuator teeth of the second gimbal gear slide freely along the grooves of the first set without impeding the ball's rotation; and
   wherein when the second gimbal gear is activated to rotate the spherical ball, the actuator teeth of the first gimbal gear slide freely along the grooves of the second set without impeding the ball's rotation;
   a first motor arranged to drive the first gear;
   a second motor arranged to drive the second gear; and
   at least one power source electrically coupled to the first motor and the second motor;
   wherein the housing is configured to be coupled to a freely moving structure as a gimbal.

2. The gimbal system as recited in claim 1, wherein the housing is configured to stabilize a relative position of the grooved, rotatable ball, the first gear, and the second gear within the housing.

3. The gimbal system as recited in claim 1, wherein the first gear and the second gear are configured to spin independently of each other.

* * * * *